United States Patent
Gao et al.

(10) Patent No.: US 10,146,459 B1
(45) Date of Patent: Dec. 4, 2018

(54) DISK ACTIVITY BALANCING IN MAPPED RAID STORAGE ARRAYS BY DATA REMAPPING

(71) Applicant: EMC IP Holding Company LLC, Hopkinton, MA (US)

(72) Inventors: Jian Gao, Beijing (CN); Michael Wahl, Bulverde, TX (US); Geng Han, Beijing (CN); Hongpo Gao, Beijing (CN); Lifeng Yang, Beijing (CN); Jamin Kang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/581,944

(22) Filed: Apr. 28, 2017

(51) Int. Cl.
*G06F 3/06* (2006.01)

(52) U.S. Cl.
CPC .......... *G06F 3/0619* (2013.01); *G06F 3/0665* (2013.01); *G06F 3/0689* (2013.01)

(58) Field of Classification Search
CPC .... G06F 3/0613; G06F 3/0619; G06F 3/0631; G06F 3/0647; G06F 3/0665; G06F 3/089
USPC ......................................... 711/114; 714/6.24
See application file for complete search history.

(56) References Cited

U.S. PATENT DOCUMENTS

| | | | |
|---|---|---|---|
| 8,555,021 B1* | 10/2013 | Barturen | G06F 3/061 711/114 |
| 9,641,615 B1 | 5/2017 | Robins et al. | |
| 9,690,660 B1 | 6/2017 | Robins et al. | |
| 2003/0014584 A1* | 1/2003 | Kodama | G06F 3/0613 711/112 |
| 2003/0212872 A1* | 11/2003 | Patterson | G06F 3/0601 711/165 |
| 2011/0167219 A1 | 7/2011 | Klemm et al. | |
| 2015/0301896 A1 | 10/2015 | Aliev et al. | |

OTHER PUBLICATIONS

IBM Corporation, "Declustered RAID," IBM Knowledge Center. Retrieved from Internet <URL: http://www.ibm.com/support/knowledgecenter/SSFKCN_4.1.0/com.ibm.cluster.gpfs.v4r1.gpfs200.doc/bl1adv_introdeclustered.htm> on Mar. 22, 2017, 3 pages, version 4.1.0.
Roman Vladimirovich Marchenko, et al., "Data Storage System Tiering Accounting for Limited Write Endurance," Russian Patent Application No. PCT/RU2016/000941, filed Dec. 28, 2016.
Peter Puhov, et al., "Virtual Drive Based Raid Groups," U.S. Appl. No. 15/393,859, filed Dec. 29, 2016.
Jian Gao, et al., "Providing RAID-10 With a Configurable RAID Width Using a Mapped RAID Group," U.S. Appl. No. 15/499,546, filed Apr. 27, 2017.

(Continued)

*Primary Examiner* — Gary J Portka
(74) *Attorney, Agent, or Firm* — BainwoodHuang

(57) ABSTRACT

Techniques are disclosed which monitor the distribution of I/O activity across the storage drives of a data storage system and detect non-uniform distributions of I/O operations across the storage drives by monitoring I/O operations directed to disk extents supporting mapped RAID extents. In response to detecting non-uniform distributions of I/O operations across the storage drives, these techniques identify LUNs with non-uniform I/O patterns and redistribute data stored in those LUNs across RAID extents supporting those LUNs.

19 Claims, 5 Drawing Sheets

(56) References Cited

OTHER PUBLICATIONS

Hongpo Gao, et al., "Adjustable Error Sensitivity for Taking Disks Offline in a Mapped RAID Storage Array," U.S. Appl. No. 15/499,669, filed Apr. 27, 2017.
Jamin Kang, et al., "Distributing Mapped RAID Disk Extents When Proactively Copying From an EOL Disk," U.S. Appl. No. 15/581,935, filed Apr. 28, 2017.
Jian Gao, et al., "Splitting a Group of Physical Data Storage Devices Into Partnership Groups to Limit the Risk of Data Loss During Drive Rebuilds in a Mapped RAID (Redundant Array of Independent Disks) Data Storage System," U.S. Appl. No. 15/497,984, filed Apr. 26, 2017.
Jian Gao, et al., "Reducing Concurrency Bottlenecks While Rebuilding a Failed Drive in a Data Storage System," U.S. Appl. No. 15/498,609, filed Apr. 27, 2017.
Shaoqin Gong, et al., "Disk Extent Rebalancing in Mapped RAID Storage Arrays," U.S. Appl. No. 15/495,240, filed Apr. 24, 2017.

\* cited by examiner

DISK ACTIVITY BALANCING IN MAPPED RAID STORAGE ARRAYS BY DATA REMAPPING

BACKGROUND

Data storage systems are arrangements of hardware and software that typically include multiple storage processors coupled to arrays of non-volatile data storage devices, such as magnetic disk drives, electronic flash drives, and/or optical drives. The storage processors service host I/O operations received from host machines. The received I/O operations specify storage objects (e.g. logical disks or "LUNs") that are to be written, read, created, or deleted. The storage processors run software that manages incoming I/O operations and that performs various data processing tasks to organize and secure the host data received from the host machines and stored on the non-volatile data storage devices Many conventional data storage systems use RAID (redundant array of independent disks) technology to store large volumes of data across numerous physical storage drives without requiring user machines to address each individual disk. RAID systems also frequently store data redundantly so data can be recovered if one or more storage drives fail unexpectedly.

Some data storage systems using RAID technology include spare storage drives which are reserved as "hot spares" in case one or more storage drives fail. In the event of a drive failure, the system can be "rebuilt" by reconstructing data from the failed drive using data from the remaining drives and then writing the recovered data to a spare drive. Once all the recovered data has been written to the spare drive, the system can continue normal operation.

SUMMARY

Unfortunately, conventional data storage systems using RAID may experience performance limitations. Upon failure of a drive, performing a rebuild of the system requires reading data from the remaining drives and copying the reconstructed data to a spare drive which may have limited write performance. The speed of rebuilding the system will be bottlenecked by the maximum write throughput for writing the reconstructed data to the spare drive. The system is vulnerable to permanent data loss if an additional drive fails before the rebuild process is completed.

The speed of the rebuild process can be improved by using mapped RAID techniques. In mapped RAID, the system distributes data across RAID extents which are made up of disk extents. The disk extents of each RAID extent are provided by different physical storage drives. Instead of reserving one or more entire physical drives as spares, mapped RAID allocates spare disk extents distributed across a large pool of drives in the data storage system. Consequently, rebuilding data from a failed drive involves writing data to spare disk extents distributed across multiple drives. Because rebuilding mapped RAID data involves writing to multiple drives in parallel (rather than to a single drive), the speed of the rebuild process is no longer limited by the minimum time required to write all the rebuilt data to a single drive.

However, over time, some storage drives in a mapped RAID system may be accessed more frequently than others, due to some data being accessed more frequently than other data. Unfortunately, non-uniform utilization of storage drives can lead to poor performance and premature system failures due to drives having limited operational lifetimes.

In contrast with prior approaches, improved techniques monitor the distribution of I/O activity across the storage drives of a data storage system and detect non-uniform distributions of I/O operations across the storage drives by monitoring I/O operations directed to disk extents supporting mapped RAID extents. In response to detecting non-uniform distributions of I/O operations across the storage drives, these techniques identify LUNs with non-uniform I/O patterns and redistribute data stored in those LUNs across RAID extents supporting those LUNs.

Certain embodiments are directed to a method of storing data in a data storage system using mapped RAID. The method includes providing, by processing circuitry, a set of RAID extents for storing data in the data storage system, each RAID extent having a respective set of disk extents allocated thereto, each disk extent supported by an extent of storage on a physical storage drive of a set of physical storage drives in the data storage system; and providing, by the processing circuitry, a set of LUNs, each LUN storing LUN data in a set of RAID extents belonging to that LUN. The method further includes calculating, by the processing circuitry, a respective drive temperature for each physical storage drive of the set of physical storage drives in the data storage system, the respective drive temperature for each physical storage drive indicating a quantity of I/O requests directed to that physical storage drive by the processing circuitry over an interval of time; generating an excessive variation result indicating that a level of variation amongst the respective drive temperatures for each physical storage drive of the set of physical storage drives exceeds a predetermined threshold; and, in response to generating the excessive variance result, performing a LUN shuffling operation to redistribute LUN data of a LUN across the set of RAID extents belonging to that LUN.

Other embodiments are directed to a computer program product, an apparatus, and a system configured to perform similar methods.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

Improved techniques monitor the distribution of I/O activity across the storage drives of a data storage system and detect non-uniform distributions of I/O operations across the storage drives by monitoring I/O operations directed to disk extents supporting mapped RAID extents. In response to detecting non-uniform distributions of I/O operations across the storage drives, these techniques identify LUNs with non-uniform I/O patterns and redistribute data stored in those LUNs across RAID extents supporting those LUNs.

Figure 1:
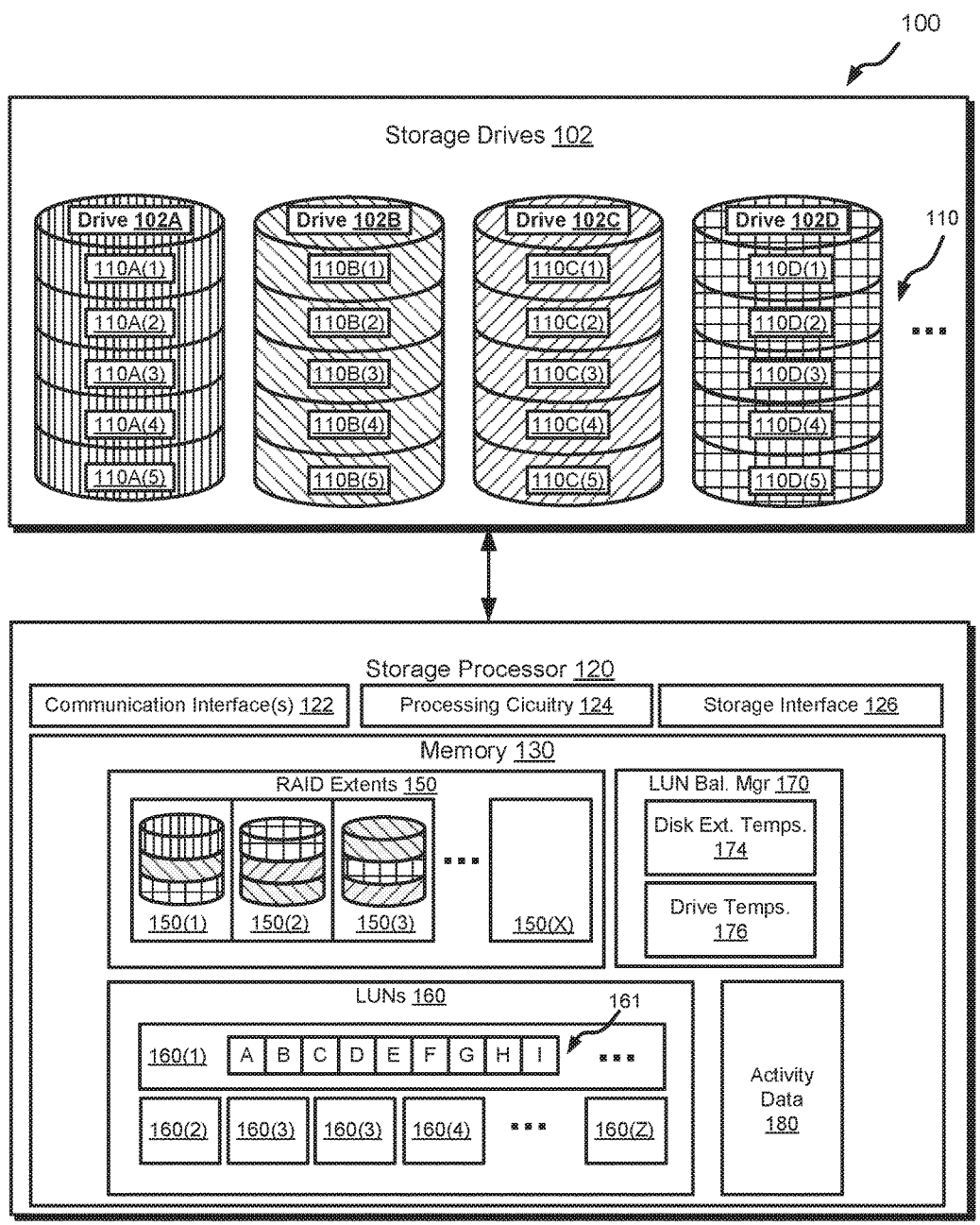
FIG. 1 is a block diagram of an example data storage system for use in connection with various embodiments.

FIG. 1 shows an example data storage system 100 in which embodiments of the improved technique hereof can be practiced. The data storage system 100 may be, for example, a VNX, VNXe, or VMAX data storage appliance manufactured by Dell EMC of Hopkinton, Mass. The data storage system 100 includes a set of physical storage drives 102 depicted as storage drives 102A, 102B, 102C, 102D, . . . etc. which supply a set of disk extents 110. The storage drives 102 may include any combination of magnetic disk drives, flash storage drives, and other storage devices. Although only four storage drives 102 are depicted, it should be understood that a data storage system 100 may have any number of storage drives 102.

Each of the storage drives 102 contains a set of disk extents 110 belonging to that drive 102. For instance, storage drive 102A is shown with five disk extents 110A(1)-110A(5). Similarly, drive 102B is shown with a set of five disk extents 110B(1)-110B(5) and so on. Each disk extent 110 is depicted with a shading pattern which identifies the storage drive 102 it belongs to. A typical disk extent 110 may have a capacity of 4 gigabytes, for example. Although each storage drive 102 is depicted having exactly five disk extents 110, it should be understood that each storage drive 102 of a data storage system 100 may have any number of disk extents 110.

In addition, it should be understood that the set of physical storage drives 102 may be treated either as single pool of storage drives 102 or as many pools, each pool containing a subset of the set of physical storage drives 102 and that the methods disclosed herein may be applied either to all the physical storage drives 102 or separately to one or more pools of the storage drives 102.

The data storage system 100 has a storage processor 120 coupled to the storage drives 102. The storage processor 120 includes communication interface circuitry 122, processing circuitry 124, storage interface circuitry 126, and memory 130. In some embodiments, there may be more than one storage processor 120.

The communications interface circuitry 122 may include one or more Ethernet cards, cellular modems, FC adapters, Wireless Fidelity (Wi-Fi) wireless networking adapters, and/or other devices for connecting to a network. Processing circuitry 124 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Processing circuitry 124 handles instructions, including requests to read and write data from other devices received via the communication interface 122. The processing circuitry 124 also organizes the storage capacity of the data storage system 100 into RAID extents 150. The processing circuitry 124 further organizes the storage capacity of the data storage system 100 into LUNs 160 which provide address ranges for addressing data stored in the data storage system 100. The storage capacity provided by each LUN 160 may be managed internally in smaller units, hereafter referred to as "chunks" 161. The processing circuitry also monitors I/O activity handled by the storage processor and generates activity data 180.

In an example, chunks 161 may be 32 megabytes in size, but no specific chunk size is required. Various embodiments may implement chunk sizes in the range of one to one-hundred twenty-eight megabytes. Other embodiments may implement chunk sizes in other ranges.

Memory 130 may be any kind of digital system memory, such as, for example, random access memory (RAM). Memory 130 stores one or more operating systems (OSes) in operation (e.g., Linux, UNIX, Windows, MacOS, or a similar operating system; not depicted) and various applications (not depicted) executing on processing circuitry 124. In some embodiments, memory 130 may also include a persistent storage portion (not depicted). The persistent storage portion of memory 130 may be made up of one or more persistent storage devices, such as, for example, disks. The persistent storage portion of memory 130 is configured to store programs and data even while the data storage system 100 is powered off. The OS and the applications are typically stored in this persistent storage portion of memory so that they may be loaded into a system portion of memory 130 from this persistent storage portion of memory 130 upon a system restart. The processing circuitry 124 running one or more of these programs (such as LUN balancing manager 170) thus forms a specialized circuit constructed and arranged to carry out the various processes described herein.

Memory 130 is depicted storing the RAID extents 150, LUNs 160, and activity data 180. The memory 130 also includes, i.e., implements with executable instructions, LUN balancing manager 170, which calculates storage drive temperatures 176 and disk extent temperatures 174. The processing circuitry 124 maps disk extents 110 to various RAID extents 150 and also subdivides the LUNs 160 into chunks 161. A chunk 161 may range in size from a few megabytes to a few gigabytes. In a typical application, chunks 161 may be 32 megabytes in size, for example.

Each RAID extent 150 has a subset of the disk extents 110 allocated to it. For purposes of illustration, each RAID extent 150 is shown containing three disk extents 110 allocated to it, with each disk extent 110 shown with a corresponding shading pattern indicating which storage drive 102 it belongs to. In some arrangements a number of RAID extents 150 may collectively form a RAID group. In such arrangements, a data storage system 100 may have any number of RAID groups. A RAID group typically stores one LUN 160, although, in some embodiments, a RAID group may include several LUNs 160.

It should be understood that the RAID extents 150 are shown containing three disk extents 110 for purposes of illustration. However, a RAID extent 150 need not contain exactly three disk extents 110 and, in various embodiments, may contain any number of disk extents 110. It should also be understood that a RAID extent 150 may be implemented as a data structure representing a set of relations between logical block addresses and disk extents 110. While FIG. 1 shows the RAID extents 150 depicted as RAID extents 150(1), 150(2), and 150(3) through 150(X), this is by way of example only. It should be understood that a data storage system 100 may have any number of RAID extents 150.

In some embodiments, a RAID extent 150 must not contain more than one disk extent 110 from any one of the storage drives 102 (i.e., each disk extent 110 in a RAID extent 150 must be provided by a different storage drive 102 from each of the other disk extents 110 in that RAID extent 150). Further, in some arrangements, each RAID extent 150 must contain a specific number of disk extents 110.

For example, some embodiments may implement RAID 5 and require exactly five disk extents 110 in each RAID extent 150. Other embodiments may implement RAID 5 with exactly eight disk extents 110 in each RAID extent 150. Still other arrangements may implement other RAID configurations, such as RAID 6, or RAID 10, and require various other numbers of disk extents 110 in each RAID extent 150. Furthermore, some embodiments may implement various combinations of RAID configurations.

The activity data 180 contains information about the I/O operations handled by the storage processor(s) 120 directed to storage drives 102 and disk extents 110 of the data storage system 100 over an interval of time (e.g., twenty-four hours). The activity data 180 may each include information such as a type of I/O operation (e.g., a read operation or a write operation) and a number of I/O operations of that type handled over the interval of time.

The LUN balancing manager 170 uses the activity data 180 to generate the drive temperatures 176 and disk extent temperatures 174. The drive temperatures 176 represent the relative frequency of I/O operations directed to each of the storage drives 102. The disk extent temperatures 174 represent the relative frequency of I/O operations directed to each of the disk extents 110.

Figure 2A:
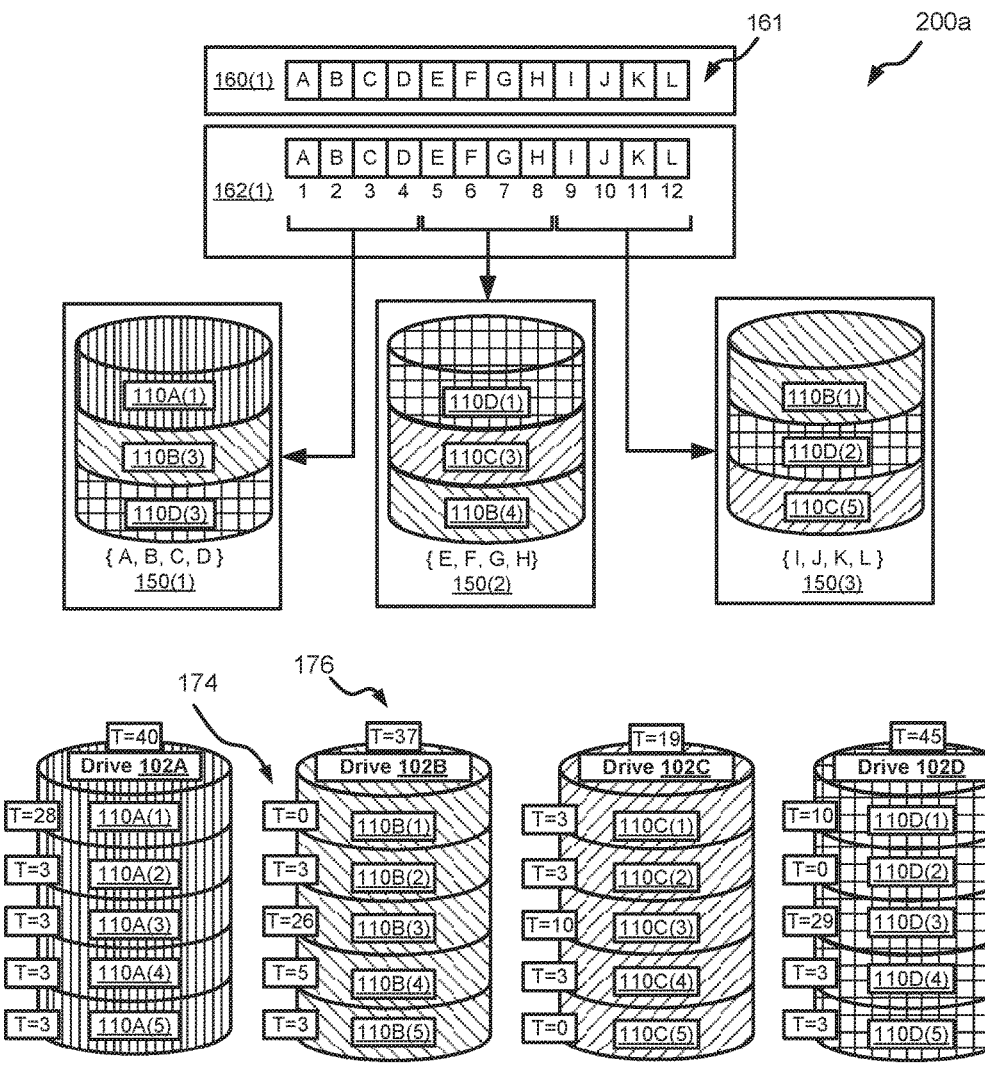
FIGS. 2A-2B show example arrangements of data structures and apparatus for use in connection with various embodiments.

FIG. 2A depicts an example arrangement 200a in a data storage system 100. Example arrangement 200a has an example LUN 160(1) divided into twelve chunks 161, labeled with uppercase letters A through L. It should be appreciated that LUN 160(1) is depicted having twelve chunks 161 for purposes of illustration and that a LUN 160 may have any number of chunks 161. Example LUN 160(1) is accompanied by an example mapping 162(1) between the chunks 161 of LUN 160(1) and the RAID extents 150(1), 150(2), and 150(3). Also shown are storage drives 102A, 102B, 102C, and 102D.

Each RAID extent 150 is depicted for example purposes as having three disk extents 110. RAID extent 150(1) contains disk extents 110A(1), 110B(3), and 110D(3). RAID extent 150(2) contains disk extents 110D(1), 110C(3), and 110B(4). RAID extent 150(3) contains disk extents 110B(1), 110D(2), and 110C(5). These disk extents 110 are supplied by the storage drives 102A, 102B, 102C, and 102D, as depicted previously in FIG. 1.

As further depicted by FIG. 2A, the storage drives 102 are associated with a set of drive temperatures 176. The drive temperatures 176 are related to the disk extent temperatures 174 associated with each disk extent 110. In some embodiments, the drive temperature 176 for each storage drive 102 is the sum of the disk extent temperatures 174 of the disk extents 110 belonging to that storage drive 102.

As above, the mapping 162(1) maps the chunks 161 of LUN 160(1) to the RAID extents 150(1), 150(2), 150(3). The mapping 162(1) shows these three RAID extents 150 together as a series of twelve locations which store an amount of data equal to the chunk size, labeled {'1,' '2,' '3,' '4,' '5,' '6,' '7,' '8,' '9,' '10,' '11,' and '12'}. In this example, the chunks 161 labeled {'A,' 'B,' 'C,' 'D,' 'E,' 'F,' 'G,' 'H,' 'I,' 'J,' 'K,' and 'L'} are mapped to the respective locations {'1,' '2,' '3,' '4,' '5,' '6,' '7,' '8,' '9,' '10,' '11,' and '12'}. The subset of locations {'1,' '2,' '3,' and '4,'} is part of RAID extent 150(1) and in this arrangement is mapped to the sub-set of chunks labeled {'A,' 'B,' 'C,' and 'D'}. The subset of locations {'5,' '6,' '7,' and '8,'} is part of RAID extent 150(2) and is mapped to the sub-set of chunks {'E,' 'F,' 'G,' and 'H,'}. The subset of locations {'9,' '10,' '11,' and '12'} is part of RAID extent 150(3) and is mapped to the sub-set of chunks labeled {'I,' 'J,' 'K,' and 'L'}.

In example arrangement 200a, the drive temperatures 176 vary. For instance the drive temperature 176 for storage drive 102A equals forty, the drive temperature for storage drive 102B equals thirty-seven, the drive temperature 176 for storage drive 102C equals nineteen, and the drive temperature 176 for storage drive 102D equals forty-five. Further, it will be noted that that most of the disk extent temperatures 174 are equal to three, except for the disk extents 110 belonging to the RAID extents 150(1), 150(2), and 150(3). In particular, the highest disk extent temperatures 174 are associated with disk extents 110A(1), 110B(3), and 110D(3), each of which belongs to RAID extent 150(1). The lowest disk extent temperatures 174 are associated with disk extents 110B(1), 110D(2), and 110C(5), each of which belong to RAID extent 150(3) and are each equal to zero. In this example arrangement, it can be inferred that the data in the subset of chunks 161 with labels {'I,' 'J,' 'K,' and 'L'} is not frequently accessed, while the data in the subset of chunks 161 with labels {'A,' 'B,' 'C,' and 'D'} is accessed much more frequently. This non-uniformity is reflected in the drive temperatures 176 of the storage drives 102 which store the chunks 161 of LUN 160(1).

Figure 2B:
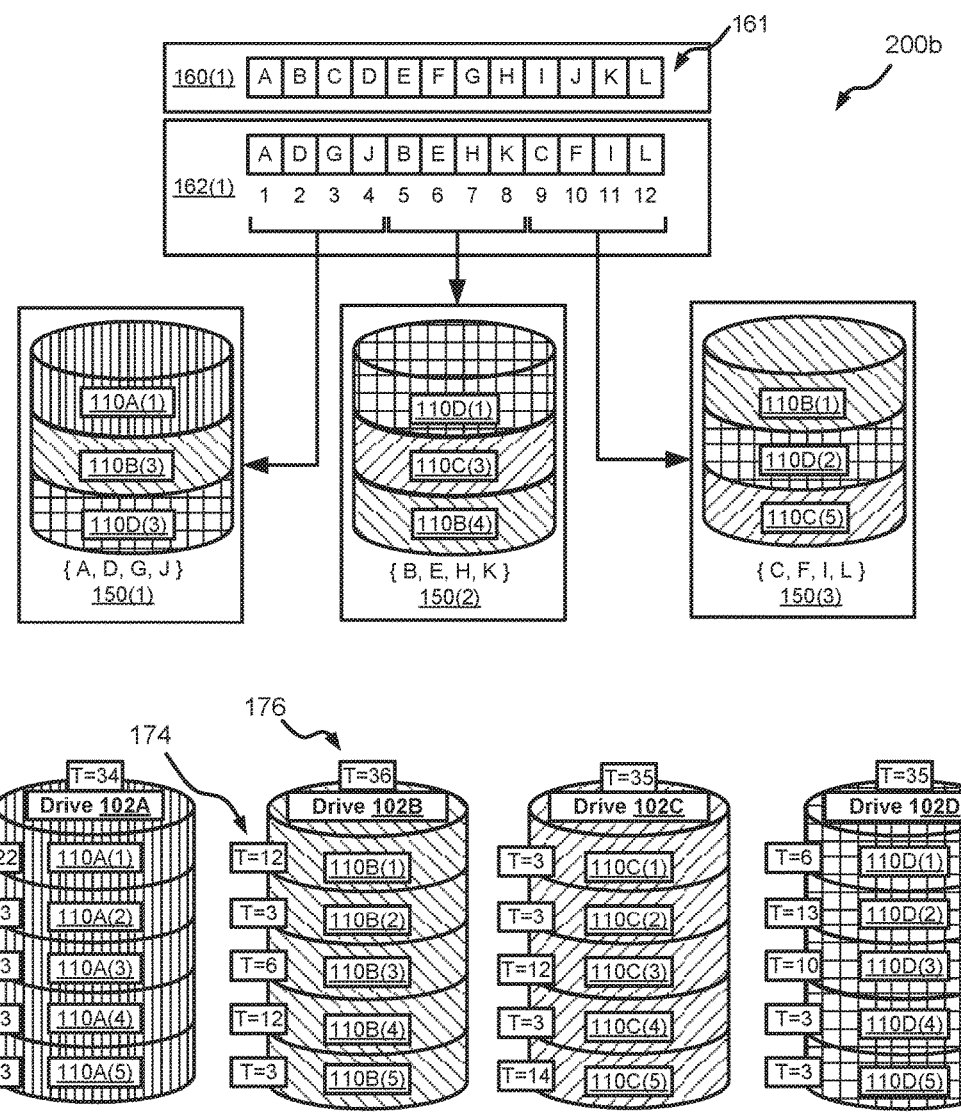

FIG. 2B depicts an alternate example arrangement 200b in the same data storage system 100. Arrangement 200a and arrangement 200b differ in the mapping 162(1) between the chunks 161 of LUN 160(1) and locations within the RAID extents 150(1), 150(2), and 150(3). In arrangement 200b, the chunks 161 labeled {'A,' 'B,' 'C,' 'D,' 'E,' 'F,' 'G,' 'H,' 'I,' 'J,' 'K,' and 'L'} are mapped to the set of RAID extent locations {'1,' '5,' '9,' '2,' '6,' '10,' '3,' '7,' '11,' '4,' '8,' and '12' } rather than {'1,' '2,' '3,' '4,' '5,' '6,' '7,' '8,' '9,' '10,' '11,' and '12' } as in arrangement 200a. Because more frequently accessed, or "hot," data is stored non-uniformly across the chunks 161 of LUN 160(1), rearranging those chunks 161 across the RAID extents 150(1), 150(2), and 150(3) may result in altering the distribution of hot data across the RAID extents 150, and consequently, across the disk extents 110, and across the storage drives 102. In example arrangement 200b, as a result of performing a shuffling operation on the mapping 162(1), some of the disk extent temperatures 174 corresponding to the disk extents 110 of the RAID extents 150(1), 150(2), and 150(3) have increased, and others have decreased, resulting in a new distribution of the disk extent temperatures 174 and the storage drive temperatures 176.

It will be observed that the values of storage drive temperatures 176 for storage drives 102A (thirty-four), 102B (thirty-six), 102C (thirty-five), and 102D (thirty-five) in arrangement 200b is much more uniform than in arrangement 200a. In this example, "shuffling" the chunks 161 of LUN 160(1) has made the distribution of hot data across the storage drives 102 more uniform.

Figure 3:
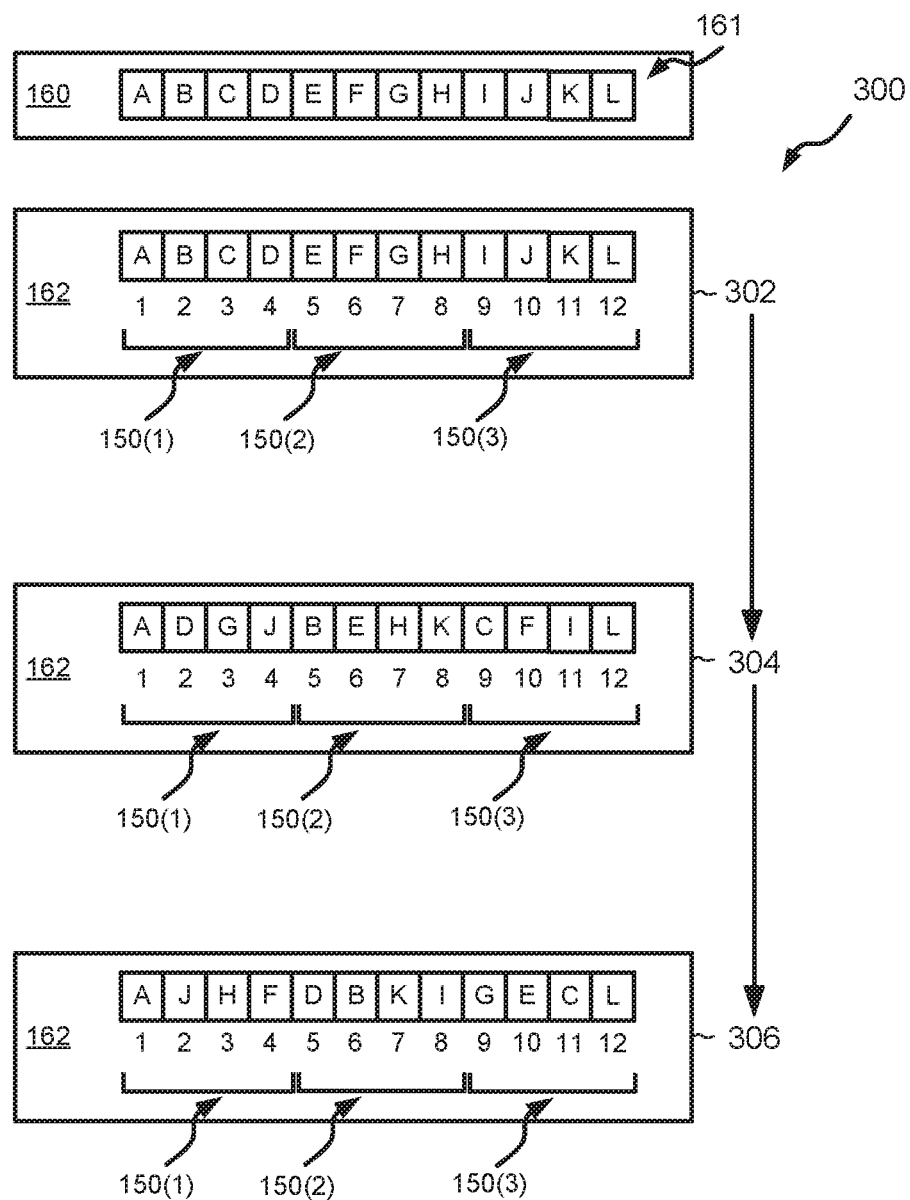
FIG. 3 shows example arrangements of data structures for use in connection with various embodiments.

FIG. 3 depicts a progression 300 of example mapping 162 for a LUN 160 through two successive LUN shuffling operations, proceeding in a cyclical fashion. In arrangement 302 The chunks 161 labeled {'A,' 'B,' 'C,' 'D,' 'E,' 'F,' 'G,' 'H,' 'I,' 'J,' 'K,' and 'L'} are mapped to the respective locations {'1,' '2,' '3,' '4,' '5,' '6,' '7,' '8,' '9,' '10,' '11,' and '12' } of the RAID extents 150. Arrangement 302 depicts an arrangement similar to arrangement 200a of FIG. 2A.

Performing a single cyclical shuffling operation on arrangement 302 produces arrangement 304. In this example, the chunks 161 labeled {'A,' 'B,' 'C,' 'D,' 'E,' 'F,'

'G,' 'H,' 'I,' 'J,' 'K,' and 'L'} are mapped to the respective locations {'1,' '5,' '9,' '2,' '6,' '10,' '3,' '7,' '11,' '4,' '8,' and '12'} of the RAID extents 150. Arrangement 304 depicts an arrangement similar to arrangement 200b of FIG. 2B.

The cyclical shuffling operation which transforms arrangement 302 into arrangement 304 can be understood as follows. As depicted in FIG. 3, a LUN 160 is stored across three RAID extents 150. In the following discussion the chunks 161 of LUN 160 will be referred to by their labels 'A' through 'L.' Starting with the first chunk 161 in the mapping 162, each successive chunk 161 in the mapping 162 is assigned in cyclical fashion to one of the RAID extents 150 (i.e., a first chunk 161 is mapped to the first RAID extent 150 (RAID extent 150(1), for example), then a second chunk 161 is mapped to a second RAID extent 150 (RAID extent 150(2), for example), then a third chunk 161 is mapped to a third RAID extent (RAID extent 150(3), for example), and so on).

For instance, chunk 'A' is the first chunk in the mapping 162 in arrangement 302 and is mapped in arrangement 304 to the first location in the first RAID extent 150(1), location '1.' Chunk 'B' is the second chunk in the mapping 162 in arrangement 302 and is mapped in arrangement 304 to the first location in the second RAID extent 150(2), location '5.' Chunk 'C' is the third chunk in the mapping 162 in arrangement 302 and is mapped in arrangement 304 to the first location in the third RAID extent 150(3), location '9.'

Once each of the RAID extents 150 in the mapping 162 has each been mapped to one chunk 161, the process begins again with the next chunk 161 in the mapping 162 in arrangement 302, chunk 'D.' As the first chunk in a second iteration, chunk 'D' is assigned to the second location in the first RAID extent 150(1), location '2.' In the same fashion as above, chunk 'E' is assigned to the second location on the second RAID extent 150(2), location '6.' Similarly, chunk 'F' is assigned to the second location on the third RAID extent 150(3), location '10.'

The cyclical shuffling process repeats until all the chunks 161 in a LUN 160 have been re-mapped. It should be understood that this process applies broadly to arrangements differing from the examples given. For instance, a LUN 160 may have any number of chunks 161 distributed across any number of RAID extents 150. However, the cyclical shuffling described operates similarly, mapping unique chunks 161 in a cyclical fashion to each of the RAID extents 150 until a unique chunk 161 has been re-mapped onto each of the RAID extents 150. After one iteration, the process continues for as many iterations as required until all the chunks 161 have been shuffled.

For purposes of illustration example arrangement 306 depicts the result of a second cyclical shuffling operation performed after obtaining arrangement 304. After the mapping 162 of arrangement 304 is cyclically shuffled to produce the mapping 162 of arrangement 306, the chunk 'A' remains mapped to location '1.' However, locations '2' and '3' are now mapped to chunks T and 'H' (instead of 'D' and 'G'), respectively. In the manner previously described, chunk 'A' remains assigned to the first location on RAID extent 150(1), location '1.' Meanwhile, the second and third chunks 161 (chunks 'D' and 'G') are assigned in arrangement 306 to the first locations on RAID extents 150(2) and 150(3), respectively. Repeating the shuffling process until all the chunks 161 in arrangement 304 have been assigned produces arrangement 306, with the chunks of LUN 160 labeled {'A,' 'B,' 'C,' 'D,' 'E,' 'F,' 'G,' 'H,' 'I,' 'J,' 'K,' and 'L'} mapped to the respective locations {'1,' '6,' '11,' '5,' '10,' '4,' '9,' '3,' '8,' '2,' '7,' and '12'}.

It should be understood that the cyclical shuffling operation has been described as a series of procedural steps for purposes of illustration. In some embodiments, these procedural steps may be performed simultaneously or by means of specialized circuitry which implements the operation differently from the foregoing description. The cyclical shuffling operation should be understood as any operation which achieves the described permutations of the mapping 162.

For instance, sequentially applying more than one iteration of the cyclical shuffling operation can still be understood as performing a single iteration of a similarly defined cyclical shuffling operation. This can be appreciated with reference to arrangements 302, 304, and 306. Arrangement 304 is the result of applying one iteration of the cyclical shuffling operation to arrangement 302, while arrangement 306 is the result of applying two iterations to arrangement 302.

In arrangement 304, chunks 161, formerly in adjacent locations (e.g., 'A' and 'B,' originally mapped to locations '1' and '2' in arrangement 302) are subsequently separated by four locations in arrangement 304 after applying one cyclical shuffling iteration (e.g., 'A' and 'B,' are subsequently mapped to locations '1' and '5' in arrangement 304). For clarity, the separation between initially adjacent chunks will be called a "skip distance." Thus, in this example, applying one iteration of the cyclical shuffling operation to mapping 162 increases the skip distance of the mapping 162 from one to four.

Applying a second iteration of the shuffling operation to arrangement 302 produces arrangement 306. In arrangement 306, the skip distance is now five instead of four (i.e., 'A' and 'B,' are mapped to locations '1' and '6' in arrangement 306, which are five locations apart). Thus, in the example of FIG. 3, applying one iteration of the shuffling operation produces an arrangement with a new skip distance of four, whereas applying two iterations of the shuffling operation is the same as applying a single iteration which produces a skip distance of five instead of four.

It should be understood that, in the examples shown, the described cyclical shuffling operation does not re-map the first chunk 161 in the mapping 162. As a result, the skip distance from certain chunks 161 to other chunks 161 will be larger by one when moving from left to right, past the ends of the mapping sequence (e.g., the skip distance from 'C' to 'D' is five instead of four in arrangement 304 and six instead of five in arrangement 306). In some embodiments, however, the cyclical shuffling operation re-maps the first chunk 161 as well.

It should be appreciated that the characteristic skip distance of each iteration depends on the particular number of RAID extents 150 assigned to the LUN 160 and the number of locations in those RAID extents 150. For instance, the skip distance corresponding to one shuffling operation is four because there are four locations in each RAID extent 150 in the examples shown in FIG. 2A, FIG. 2B, and FIG. 3).

In some embodiments the LUN balancing manager 170 evaluates a prospective result of performing the LUN shuffling operation before actually performing the operation. For instance, the LUN balancing manager 170 may evaluate an expected distribution of disk extent temperatures 174 and drive temperatures 176 (such as the one shown in FIG. 2B for arrangement 200b). In some embodiments, the LUN shuffling operation is only performed if it will generate an acceptable degree of improvement over the prior state of the data storage system 100. In such embodiments, the LUN balancing manager 170 may perform additional iterations, producing arrangements equivalent to shuffling the mapped LUNs 160 multiple times until an arrangement with an acceptable degree of improvement of the prior state of the data storage system 100 has been identified. In still other embodiments, the LUN balancing manager 170 evaluates a set of possible arrangements, each arrangement corresponding to a different number of iterations of the shuffling process and selects the best possible arrangement from the set of possible arrangements.

It should be understood that various processes and operations described as operating on mappings 162 between chunks 161 of LUNs 160 and RAID extents 150 include moving, copying, or deleting data stored on the storage drives 102 of the data storage system 100 as required to implement the arrangements and mappings 162 described.

For example, if an operation or process maps a chunk 161 storing data belonging to LUN 160 to a new location, it may be required to copy the data from its original physical location on a storage drive 102 to a new physical location on the same storage drive 102 or a different storage drive 102. If both the original and the new location contain data belonging to a LUN 160, then the data stored in either or both locations may be copied and temporarily stored while the data storage system 100 moves data between the two locations in order to implement a particular arrangement or mapping 162.

Figure 4:
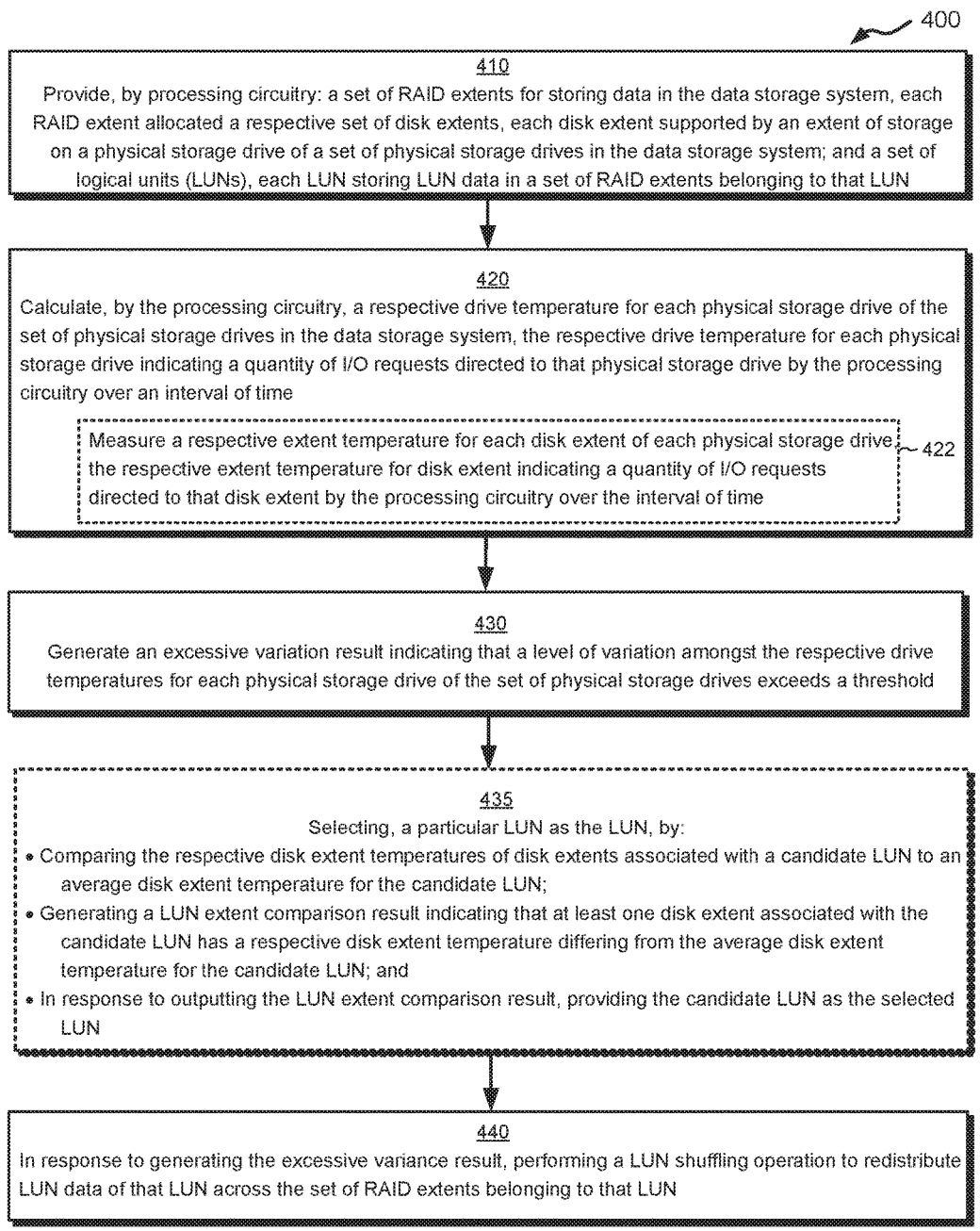
FIG. 4 is a flowchart depicting example methods of various embodiments.

FIG. 4 shows an example process 400 used in some embodiments. The process 400 includes steps 410, 420, 430, 435, and 440 and sub-step 422. It should be understood that any time a piece of software (e.g., LUN balancing manager 170) is described as performing a method, process, step, or function, in actuality what is meant is that a computing device (e.g., data storage system 100 or its component storage processor 120, etc.) on which that piece of software is running performs the method, process, step, or function when executing that piece of software on its processing circuitry 124. It should be understood that although depicted in one order, one or more steps or sub-steps may be combined together or performed in a different order. Dashed steps are ancillary or optional in some embodiments. Further, it should be understood that, in some embodiments, one or more of the steps may be omitted. Similarly, in some embodiments, one or more steps may be combined together or performed in a different order.

At step 410 the processing circuitry 124 provides a set of RAID extents 150 for storing data in the data storage system 100. Each RAID extent 150 is allocated a respective set of disk extents 110. Each disk extent 110 is supported by an extent of storage on a physical storage drive 102 of a set of physical storage drives 102 in the data storage system 100. The processing circuitry 124 also provides a set of LUNs 160 (depicted as LUNs 160(1), 160(2), 160(3), 160(4), . . . , through 160(Z) in FIG. 1). Each LUN 160 stores LUN data (data stored specifically by that LUN 160) in a set of RAID extents 150 belonging to that LUN 160.

At step 420, the LUN balancing manager 170 calculates a respective drive temperature 176 for each physical storage drive 102 of the set of physical storage drives 102 in the data storage system 100, the respective drive temperature 176 for each physical storage drive indicating a quantity of I/O requests directed to that physical storage drive 102 by the processing circuitry 124 over an interval of time. In some embodiments the LUN balancing manager 170 calculates the drive temperatures 176 based upon both read and write requests. In other embodiments, the LUN balancing manager 170 may use only read requests, only write requests, or other data related to the I/O activity 180 of the data storage system 100. In some embodiments the LUN balancing manager 170 performs step 420 by summing the disk extent temperatures 174 for all disk extents 110 of a particular storage drive 102, storing the sum as the drive temperature 176 for that storage drive 102.

Step 420 may optionally include sub-step 422. At sub-step 422 the LUN balancing manager 170 measures a respective extent temperature 174 for each disk extent 110 of each physical storage drive 102, the respective extent temperature 174 each for disk extent 110 indicating a quantity of I/O requests directed to that disk extent 110 by the processing circuitry 124 over the interval of time. In some embodiments the LUN balancing manager 170 calculates the disk extent temperatures 174 based upon both read and write requests. In other embodiments, the LUN balancing manager 170 may use only read requests, only write requests, or other data related to the I/O activity 180 of the data storage system 100.

At step 430 LUN balancing manager 170 generates an excessive variation result indicating that a level of variation amongst the respective drive temperatures 176 for each physical storage drive 102 of the set of physical storage drives 102 exceeds a predetermined threshold. In an example, the level of variation may correspond to a standard deviation. It should be understood, however, that the level of variation may correspond to any other suitable measure.

In some embodiments, at step 435, the LUN balancing manager 170 selects a particular LUN 160 by comparing the respective disk extent temperatures 174 of disk extents 110 associated with a candidate LUN 160 to an average of the disk extent temperatures 174 for the candidate LUN 160 and generates a LUN extent comparison result indicating that at least one disk extent 110 associated with the candidate LUN 160 has a respective disk extent temperature 174 differing from the average disk extent temperature 174 for the candidate LUN 160. In response to generating the LUN extent comparison result, the LUN balancing manager 170 provides the candidate LUN 160 as the selected LUN 160.

At step 440, the LUN balancing manager 170, in response to an excessive variance result, performs a LUN shuffling operation to redistribute LUN data of a LUN 160 (such as the particular LUN optionally selected in step 435 in some embodiments) across the set of RAID 150 extents belonging to that LUN 160.

In some embodiments, after the steps of process 400 have been performed, the steps may be periodically repeated, beginning again at step 420. In some embodiments these periodic repetitions may be performed on an hourly, daily, or other basis.

Thus, techniques have been presented which monitor the distribution of I/O activity 180 across the storage drives 102 of a data storage system 100 and detect non-uniform distributions of I/O operations across the storage drives 102 by monitoring I/O operations directed to disk extents 110 supporting mapped RAID extents 150. In response to detecting non-uniform distributions of I/O operations across the storage drives 102, these techniques identify LUNs 160 with non-uniform I/O patterns and redistribute data stored in those LUNs 160 across RAID 150 extents supporting those LUNs 160.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of storing data in a data storage system using mapped RAID, the method comprising:
    providing, by processing circuitry:
        a set of RAID extents for storing data in the data storage system, each RAID extent having a respective set of disk extents allocated thereto, each disk extent supported by an extent of storage on a physical storage drive of a set of physical storage drives in the data storage system; and
        a set of logical units (LUNs), each LUN storing LUN data in a set of RAID extents belonging to that LUN;
    calculating, by the processing circuitry, a respective drive temperature for each physical storage drive of the set of physical storage drives in the data storage system, the respective drive temperature for each physical storage drive indicating a quantity of I/O requests directed to that physical storage drive by the processing circuitry over an interval of time;
    generating an excessive variation result indicating that a level of variation amongst the respective drive temperatures for each physical storage drive of the set of physical storage drives exceeds a threshold; and
    in response to generating the excessive variation result, performing a LUN shuffling operation to redistribute LUN data of a LUN across the set of RAID extents belonging to that LUN.

2. The method of claim 1, wherein calculating, by the processing circuitry, the respective drive temperature for each physical storage drive of the set of physical storage drives includes measuring a respective extent temperature for each disk extent of each physical storage drive, the respective extent temperature for disk extent indicating a quantity of I/O requests directed to that disk extent by the processing circuitry over the interval of time.

3. The method of claim 2, wherein the method further comprises selecting, a particular LUN as the LUN, by:
    comparing the respective disk extent temperatures of disk extents associated with a candidate LUN to an average disk extent temperature for the candidate LUN;
    generating a LUN extent comparison result indicating that at least one disk extent associated with the candidate LUN has a respective disk extent temperature differing from the average disk extent temperature for the candidate LUN; and
    in response to generating the LUN extent comparison result, providing the candidate LUN as the selected LUN.

4. The method of claim 1,
    wherein each LUN is represented as a set of chunks, each chunk being assigned to a RAID extent according to a current mapping of chunks to RAID extents; and
    wherein performing the LUN shuffling operation includes transforming the current mapping of chunks to RAID extents into a shuffled mapping of chunks to RAID extents in a cyclical manner with respect to the RAID extents.

5. The method of claim 4, wherein each chunk of each LUN corresponds to contiguous range of logical block addresses belonging to that LUN, the chunk having a data capacity in a range between 1 and 128 megabytes.

6. The method of claim 1, wherein the respective drive temperature for each physical storage drive is calculated based exclusively on a quantity of write requests directed to that physical storage drive.

7. The method of claim 1, wherein the method further comprises performing at subsequent time intervals:
    recalculating the respective drive temperature for each physical storage drive of the set of physical storage drives over each subsequent time interval;
    generating additional excessive variation results indicating that levels of variation amongst the respective drive temperatures for each physical storage drive exceed the threshold; and
    in response to generating the excessive variation results, performing additional LUN shuffling operations to redistribute LUN data of one or more LUNs across the set of RAID extents belonging to those LUNs.

8. The method of claim 7, wherein the subsequent time intervals occur once each day.

9. A data storage system comprising:
    a set of physical storage drives;
    memory, storing a set of instructions; and processing circuitry coupled to the memory and the set of physical storage drives, the processing circuitry constructed and arranged to execute the instructions stored by the memory, causing the processing circuitry to:
provide a set of RAID extents for storing data in the data storage system, each RAID extent having a respective set of disk extents allocated thereto, each disk extent supported by an extent of storage on a physical storage drive of the set of physical storage drives in the data storage system;
provide a set of logical units (LUNs), each LUN storing LUN data in a set of RAID extents belonging to that LUN;
calculate a respective drive temperature for each physical storage drive of the set of physical storage drives in the data storage system, the respective drive temperature for each physical storage drive indicating a quantity of I/O requests directed to that physical storage drive by the processing circuitry over an interval of time;
generate an excessive variation result indicating that a level of variation amongst the respective drive temperatures for each physical storage drive of the set of physical storage drives exceeds a threshold; and
perform, in response to generating the excessive variation result, a LUN shuffling operation to redistribute LUN data of a LUN across the set of RAID extents belonging to that LUN.

10. The data storage system of claim 9, wherein the processing circuitry, when calculating the respective drive temperature for each physical storage drive of the set of physical storage drives is constructed and arranged to measure a respective extent temperature for each disk extent of each physical storage drive, the respective extent temperature for disk extent indicating a quantity of I/O requests directed to that disk extent by the processing circuitry over the interval of time.

11. The data storage system of claim 10, wherein the processing circuitry is further constructed arranged to:
compare the respective disk extent temperatures of disk extents associated with a candidate LUN to an average disk extent temperature for the candidate LUN;
generate a LUN extent comparison result indicating that at least one disk extent associated with the candidate LUN has a respective disk extent temperature differing from the average disk extent temperature for the candidate LUN; and
provide the candidate LUN as the selected LUN in response to the LUN extent comparison result.

12. The data storage system of claim 9,
wherein each LUN is represented as a set of chunks, each chunk being assigned to a RAID extent according to a current mapping of chunks to RAID extents; and
wherein performing the LUN shuffling operation includes transforming the current mapping of chunks to RAID extents into a shuffled mapping of chunks to RAID extents in a cyclical manner with respect to the RAID extents.

13. The data storage system of claim 9 wherein the processing circuitry is further constructed and arranged to:
recalculate the respective drive temperature for each physical storage drive of the set of physical storage drives over each subsequent time interval; generate additional excessive variation results indicating that levels of variation amongst the respective drive temperatures for each physical storage drive exceed the threshold; and
perform additional LUN shuffling operations to redistribute LUN data of one or more LUNs across the set of RAID extents belonging to those LUNs, in response to generating the excessive variation results.

14. A computer program product comprising a non-transitory, computer-readable storage medium having instructions which, when executed by processing circuitry of a computing device, cause the processing circuitry to:
provide a set of RAID extents for storing data in the data storage system, each RAID extent having a respective set of disk extents allocated thereto, each disk extent supported by an extent of storage on a physical storage drive of a set of physical storage drives in the data storage system;
provide a set of logical units (LUNs), each LUN storing LUN data in a set of RAID extents belonging to that LUN;
calculate a respective drive temperature for each physical storage drive of the set of physical storage drives in the data storage system, the respective drive temperature for each physical storage drive indicating a quantity of I/O requests directed to that physical storage drive by the processing circuitry over an interval of time;
generate an excessive variation result indicating that a level of variation amongst the respective drive temperatures for each physical storage drive of the set of physical storage drives exceeds a threshold; and
perform, in response to generating the excessive variation result, a LUN shuffling operation to redistribute LUN data of a LUN across the set of RAID extents belonging to that LUN.

15. The computer program product of claim 14, wherein the instructions cause the process circuitry, when calculating the respective drive temperature for each physical storage drive of the set of physical storage drives, to measure a respective extent temperature for each disk extent of each physical storage drive, the respective extent temperature for disk extent indicating a quantity of I/O requests directed to that disk extent by the processing circuitry over the interval of time.

16. The computer program product of claim 15, wherein the computer program product includes further instructions causing the processing circuitry to:
compare the respective disk extent temperatures of disk extents associated with a candidate LUN to an average disk extent temperature for the candidate LUN;
generate a LUN extent comparison result indicating that at least one disk extent associated with the candidate LUN has a respective disk extent temperature differing from the average disk extent temperature for the candidate LUN; and
provide the candidate LUN as the selected LUN in response to the LUN extent comparison result.

17. The computer program product of claim 14,
wherein each LUN is represented as a set of chunks, each chunk being assigned to a RAID extent according to a current mapping of chunks to RAID extents; and
wherein performing the LUN shuffling operation includes transforming the current mapping of chunks to RAID extents into a shuffled mapping of chunks to RAID extents in a cyclical manner with respect to the RAID extents.

18. The computer program product of claim 14 wherein the computer program product includes further instructions causing the processing circuitry to:

recalculate the respective drive temperature for each physical storage drive of the set of physical storage drives over each subsequent time interval;

generate additional excessive variation results indicating that levels of variation amongst the respective drive temperatures for each physical storage drive exceed the threshold; and perform additional LUN shuffling operations to redistribute LUN data of one or more LUNs across the set of RAID extents belonging to those LUNs, in response to generating the excessive variation results.

19. The method of claim 1 wherein generating the excessive variation result indicating that the level of variation amongst the respective drive temperatures for each physical storage drive of the set of physical storage drives exceeds the threshold includes:

calculating a standard deviation of the drive temperatures for all of the physical storage drives over the interval of time; and determining that the calculated standard deviation exceeds the threshold.

* * * * *